(12) United States Patent
Knowles et al.

(10) Patent No.: US 6,992,857 B2
(45) Date of Patent: Jan. 31, 2006

(54) WEIGHTING SERVO SIGNALS FOR HEAD POSITIONING

(75) Inventors: Vernon L. Knowles, Boise, ID (US); Ralph F. Simmons, Jr., Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/770,746

(22) Filed: Feb. 2, 2004

(65) Prior Publication Data

US 2005/0168864 A1 Aug. 4, 2005

(51) Int. Cl.
*G11B 5/584* (2006.01)

(52) U.S. Cl. ................................... 360/77.12

(58) Field of Classification Search ............. 360/77.11, 360/77.12
See application file for complete search history.

(56) References Cited

U.S. PATENT DOCUMENTS 6,204,990 B1 * 3/2001 Bruccoleri et al. ...... 360/77.11
6,831,805 B2 * 12/2004 Chliwnyj et al. ........ 360/77.12

* cited by examiner

*Primary Examiner*—David Hudspeth
*Assistant Examiner*—Mitchell Slavitt

(57) ABSTRACT

In one embodiment, a servo positioning method includes deriving a first servo signal $S_1$ from a first servo band, deriving a second servo signal $S_2$ from a second servo band, defining a head element reference between the servo bands, weighting each servo signal according to a ratio of distances between the head element reference and a location on each servo band, and computing a servo control signal based on the weighted servo signals.

16 Claims, 18 Drawing Sheets

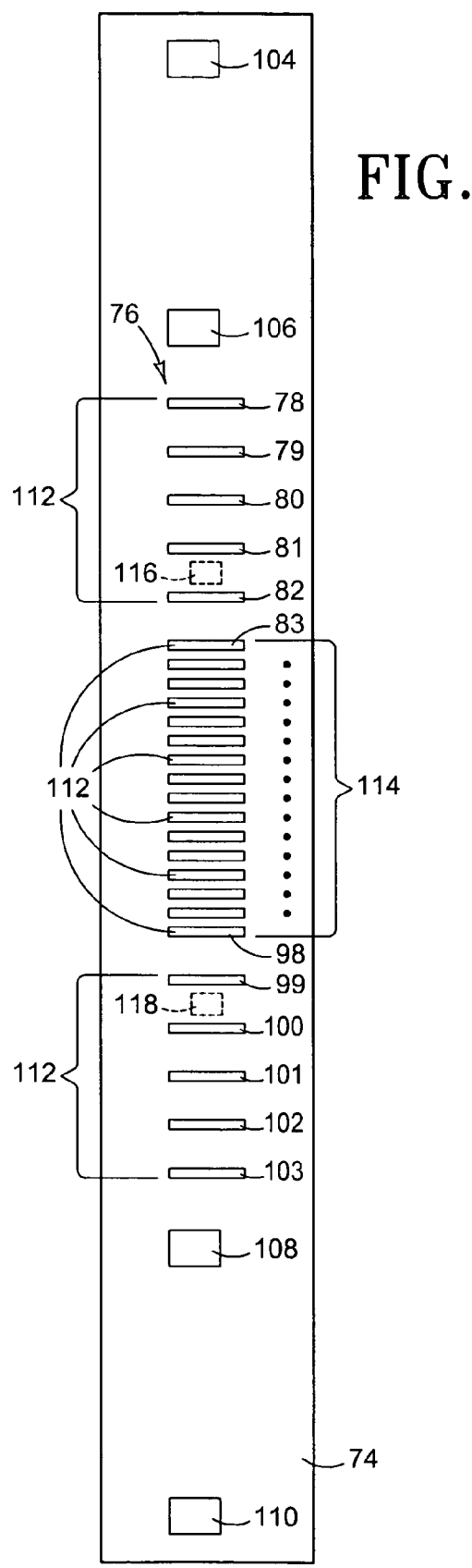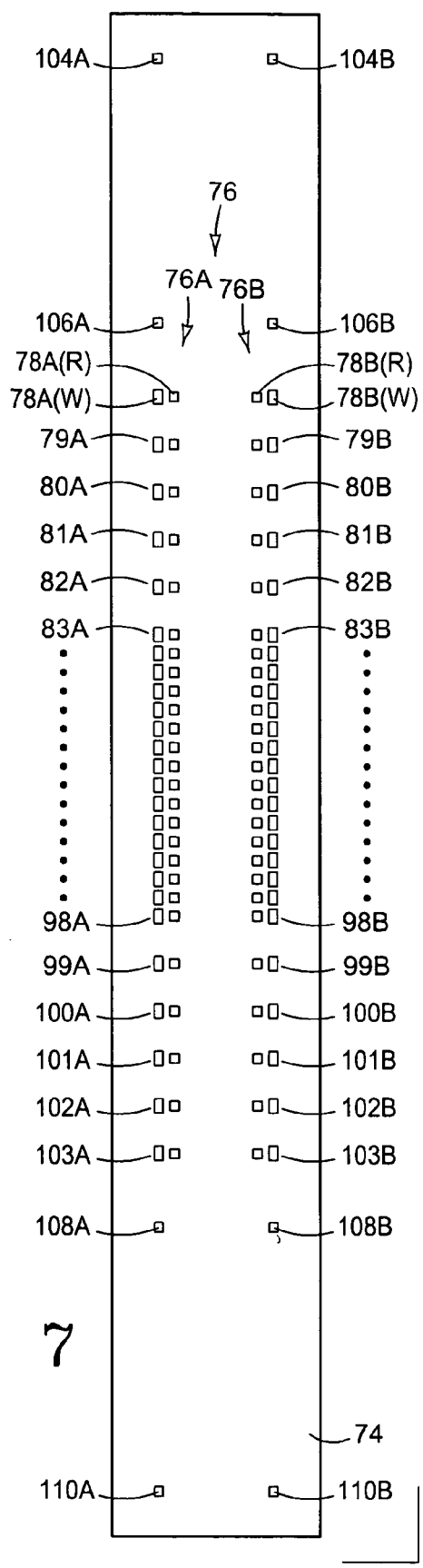

WEIGHTING SERVO SIGNALS FOR HEAD POSITIONING

BACKGROUND

Tape drives are used to store very large amounts of digital information on rolls of magnetic tape and are often used to backup information stored in computer systems. In a typical linear tape open (LTO) drive, magnetic tape is stored on a supply reel contained in a removable cartridge. Information on the tape, including servo information, is arranged in a multitude of parallel tracks that extend along the length of the tape. During operation, the tape is passed along a series of rollers, defining the tape path, to a non-removable take up reel in the tape drive. The tape passes in close proximity to an array of magnetic head elements that read and record information on the tape. The head elements must be accurately positioned over the desired tracks so information can be read or recorded without loss and without corrupting adjacent tracks. An actuator positions the head elements by moving the head containing the elements across the width of the tape. During coarse positioning, the actuator moves the head so that a read element is close enough to a desired track to read servo information. Subsequently, during fine positioning, the servo information is read from the track and sent to servo control circuitry, which then sends a signal to the actuator to move the head so that the elements are directly over the desired tracks and to follow the small lateral motion of the track as it passes by the head.

The capacity of a linear recording tape is determined, in part, by the number of tracks that can be read and recorded across the width of the tape. To reliably read and record all tracks, the head, tape and servo positioning system must achieve accurate head to tape alignment within system tolerances, including the dimensional stability of the tape. Magnetic tapes tend to shrink over the useful life of the tape. In addition, magnetic tapes shrink and expand in response to changes in temperature and humidity. Hence, the width of the tape can and usually does vary over time. That is to say, the tape is not dimensionally stable. As the number of tracks on a tape increase, the adverse effect of tape dimensional instability on head to tape alignment also increases.

DRAWINGS

FIG. 6 is a schematic illustration of an array of head elements.

FIG. 7 illustrates one example of the layout of the elements in the array of FIG. 6.

DESCRIPTION

Embodiments of the present invention were developed in an effort to reduce the adverse effect of tape dimensional instability on head to tape alignment for heads that may be aligned to an off-center reference. Embodiments of the invention will be described with reference to an LTO tape drive. The invention, however, is not limited to use in LTO drives but may be implemented in other tape drives or other recording devices.

Figure 1:
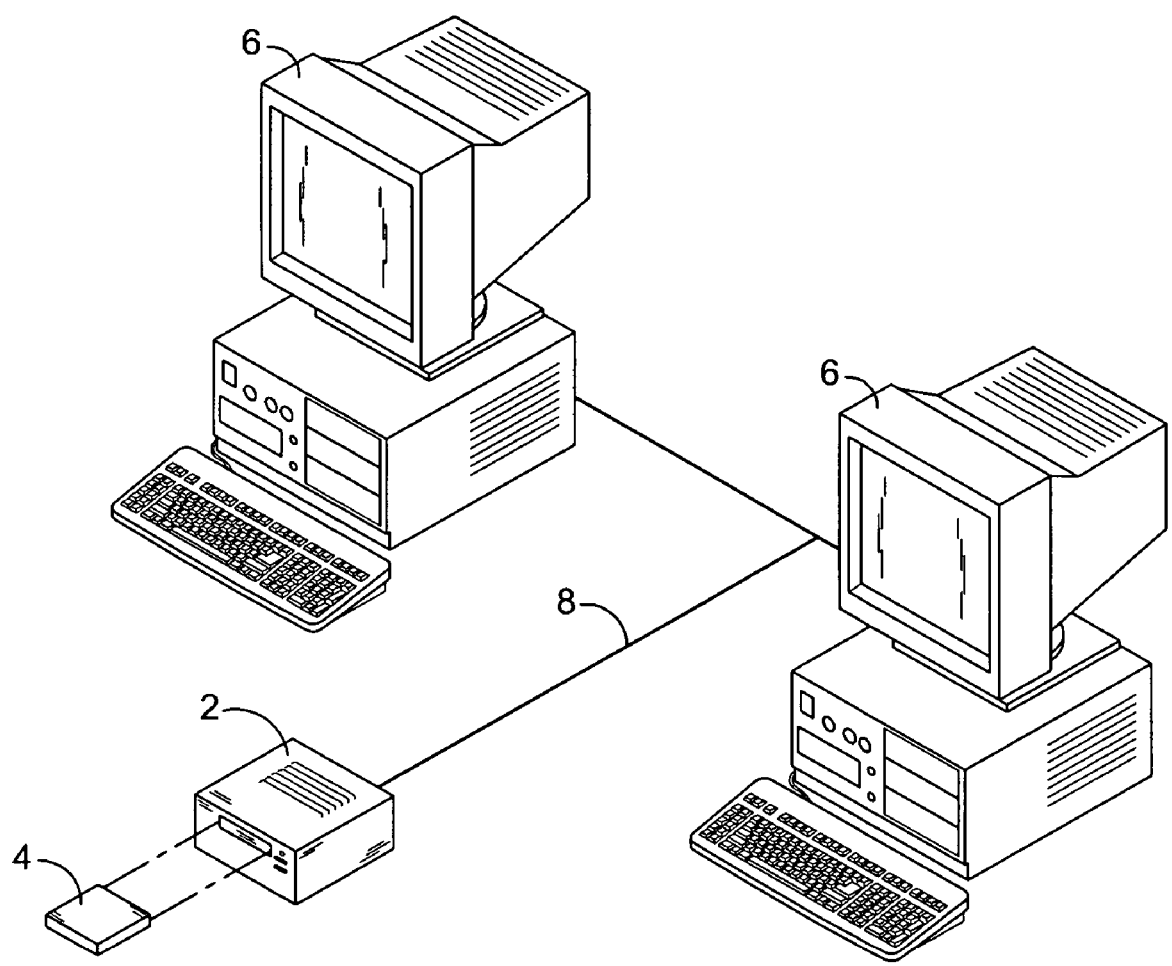
FIG. 1 shows computers networked to a tape drive.
Figure 2:
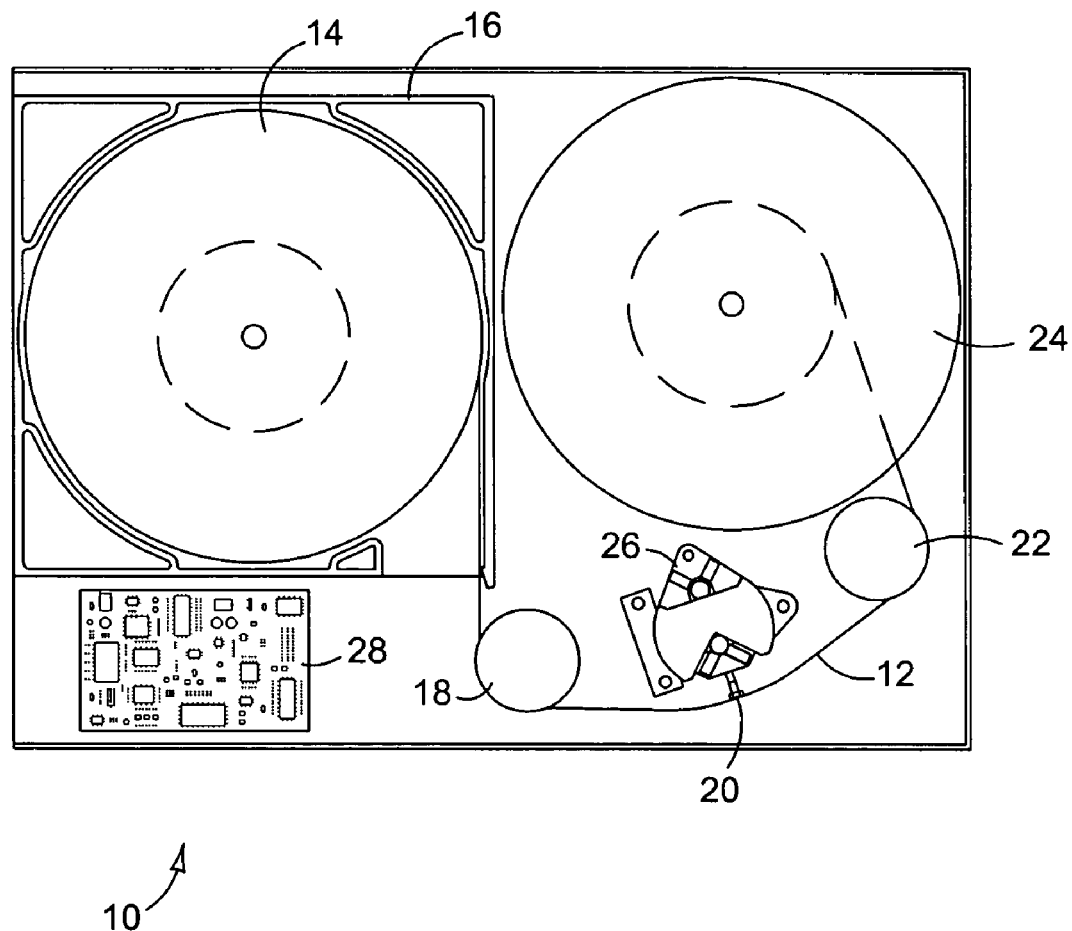
FIG. 2 is a plan view illustrating an LTO drive that may be used to implement embodiments of the invention.

FIG. 1 illustrates a tape drive 2 with a removable tape cartridge 4 networked to computers 6 through a wired or wireless link 8. FIG. 2 illustrates an LTO drive 10 such as might be used in the network of FIG. 1. In tape drive 10 in FIG. 2, magnetic tape 12 is wound on supply reel 14 inside removable cartridge 16. When cartridge 16 is inserted into drive 10, tape 12 passes around guide 18, over head 20, around guide 22, to take up reel 24. As described in detail below, head 20 contains an array of elements that read and record information on tape 12. A "head element" or just "element" as used in this document means a transducer that converts an electrical signal to the form required to record the signal to a medium (a write element), or reads a signal from a medium and converts it to an electrical signal (a read element), or both. A data element refers to a head element configured to record, read, or record and read information other than head positioning information, unless the data element is specially configured to also read head positioning information. A servo element refers to a head element configured to read head positioning information. Head positioning information is often referred to as servo information because the head position control mechanism in many modern recording devices is actuated and controlled by a low energy signal (i.e., a servo signal). Tape drives typically use magnetic head elements, where an electrical signal drives a time-varying magnetic field that magnetizes spots, or domains, on the surface of the magnetic tape. CD-ROM and other optical drives typically uses an optical head, where an electrical signal drives a laser that varies the reflectivity of an optical medium.

Head 20 is mounted to an actuator 26 which moves head 20 across the width of tape 12. An electronic controller 28 receives read and write instructions and data from a computer 6 (FIG. 1) or other host device. Controller 28, which may include more than one controller unit, includes the programming, processor(s) and associated memory and electronic circuitry necessary to control actuator 26, head 20 and the other operative components of tape drive 10. As actuator 26 carries head assembly 20 back and forth across the width of tape 12, controller 28 selectively activates the head elements to read or record data on tape 12 according to instructions received from the host device.

Figure 3:
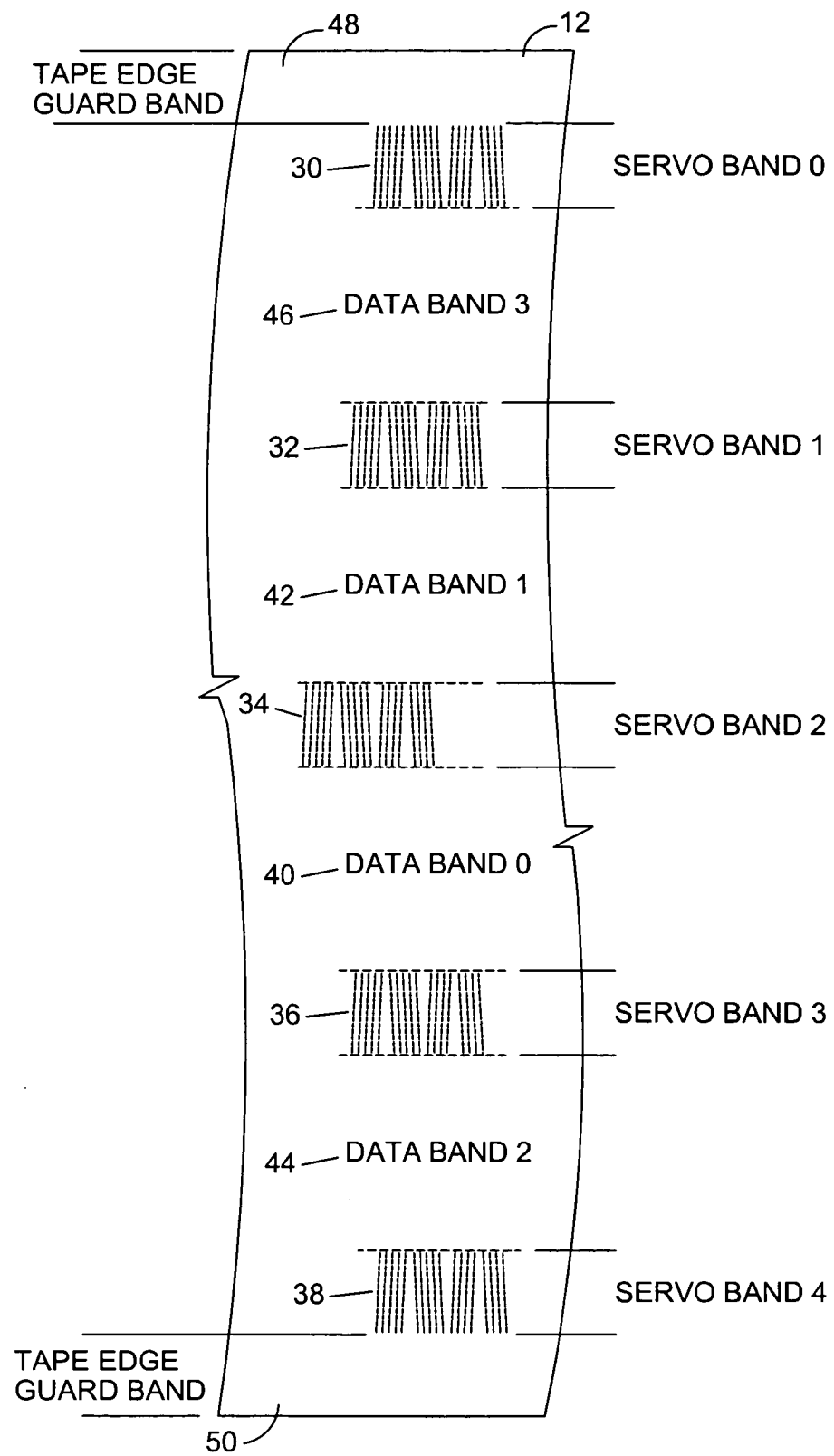
FIG. 3 shows a format typical of an LTO tape.

FIG. 3 shows one format for an LTO tape 12. Tape 12 is nominally 12.6 mm (½ inch) wide. Five servo bands 30, 32, 34, 36 and 38 border four data bands 40, 42, 44 and 46. Edge guard bands 48 and 50 separate the top and bottom servo bands 30 and 38 from the edge of tape 12. In a current generation LTO tape 12, known to those skilled in the art as the second generation, each data band 40, 42, 44 and 46 includes 128 data tracks (512 tracks total). In an immediate next generation LTO tape 12 currently in development, known to those skilled in the art as the third generation, each data band 40, 42, 44 and 46 includes 176 data tracks (704 tracks total). It is expected that future generations of LTO tape 12 will include even more data tracks.

Figure 4:
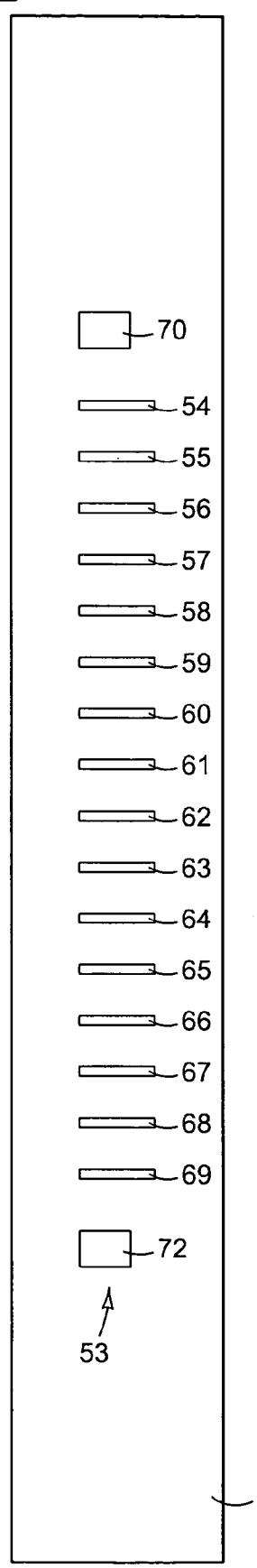
FIG. 4 is a schematic illustration of an array of head elements in a current/third generation LTO drive.

FIG. 4 is a schematic illustration of a head 52 that includes an array 53 of sixteen data elements 54–69 used in an immediate next generation LTO drive currently in development, known to those skilled in the art as the third generation. Head 52 also includes a servo element 70 above the data elements and a servo element 72 below the data elements. Servo elements 70 and 72 read servo information from the servo bands bordering each data band on tape 12 (FIG. 3). For example, and referring also to FIG. 3, if array 53 on head 52 is positioned over data band 142, then servo elements 70 and 72 read the servo positioning information recorded on servo band 132 and servo band 234. Positioning head 52 occurs in two stages for a typical read or record operation. In a first "coarse" positioning stage, head 52 is brought close enough to the desired data band (data band 142 in this example) to read servo information on the bordering servo bands (servo bands 132 and 234 in this example). Then, in a second "fine" positioning stage, servo information read from servo bands 132 and 234 is used to position data elements 54–69 over the desired tracks within data band 142.

Figure 5:
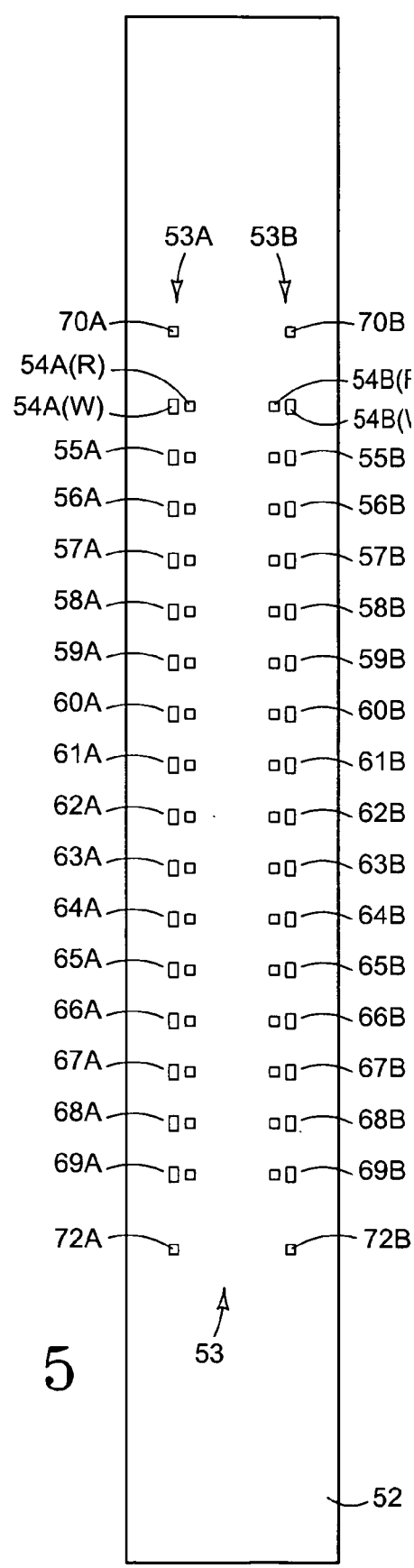
FIG. 5 illustrates one example of the layout of the elements in the array of FIG. 4.

FIG. 5 illustrates one example of the layout of the head elements in array 53 in a third generation LTO drive. Referring to FIG. 5, array 53 consists of two arrays 53A and 53B spaced apart from one another across head 52 in the direction the tape moves past head 52. Each servo element 70, 72 consists of two read elements 70A, 70B and 72A, 72B. Servo elements 70A and 72A read servo information when the tape is moving in one direction past head 52 and servo elements 70B and 72B read servo information when the tape is moving in the opposite direction past head 52. Each data element 54–69 consists of two element pairs 54A–69A and 54B–69B. Each element pair includes a read element, e.g., read elements 54A(R) and 54B(R), and a write element, e.g., write elements 54A(W) and 54B(W). Read elements in the A array and write elements in the B array (e.g., 54A(R) and 54B(W)) read and record data on the tape when the tape is moving in one direction. Read elements in the B array and write elements in the A array (e.g., 54B(R) and 54A(W)) read and record data on the tape when the tape is moving in the opposite direction.

FIG. 6 is a schematic illustration of a head 74 that includes an array 76 of data elements 78–103 and servo elements 104, 106, 108 and 110 arranged into two groups of data elements 112 and 114. There are sixteen elements in each group 112, 114. First group 112 includes elements 78–83, 86, 89, 92, 95, and 98–103. Second group 114 includes more closely spaced elements 83–98. Data elements 83, 86, 89, 92, 95, and 98 are included on both groups 112 and 114. The elements in first group 112 correspond to the sixteen data elements shown in FIG. 4 that are used in third generation LTO drives. In the embodiment shown in FIG. 6, the span of the elements in second group 114 along head 74 is ⅓ the span of the elements in first group 112 and the second group elements are centered in the span of the first group elements.

To support one mode of use for head 74 described below with reference to FIGS. 8–13, elements 82 and 99 are configured to read and record data on data bands and to read servo information on servo bands. This dual "configuration" of elements 82 and 99 occurs in the control circuitry (not shown) that supports these elements by including both a data read channel and a servo read channel for each element 82 and 99. The physical structure of elements 82 and 99 on head 74 is the same as the other data elements. As an alternative to using dual configuration data elements, discrete servo elements 116 and 118 may be added adjacent to data elements 82 and 99.

FIG. 7 illustrates one example of the layout of the head elements in array 76 as they might appear in a fourth generation LTO drive. Referring to FIG. 7, array 76 consists of two arrays 76A and 76B spaced apart from one another across head 74 in the direction the tape moves past head 74. Each servo element 104, 106, 108 and 110 consists of two read elements 104A and 104B, 106A and 106B, 108A and 108B, and 110A and 110B. Servo elements 104A, 106A, 108A, and 110A read servo information when the tape is moving in one direction past head 74 and servo elements 104B, 106B, 108B, and 110B read servo information when the tape is moving in the opposite direction past head 74. Each data element 78–103 consists of two element pairs 78A–103A and 780–103B. Each element pair includes a read element, e.g., read elements 78A(R) and 78B(R), and a write element, e.g., write elements 78A(W) and 78B(W). Read elements in the A array and write elements in the B array (e.g., 78A(R) and 78B(W)) read and record data on the tape when the tape is moving in one direction and read elements in the B array and write elements in the A array (e.g., 78B(R) and 78A(W)) read and record data on the tape when the tape is moving in the opposite direction.

Figure 8:
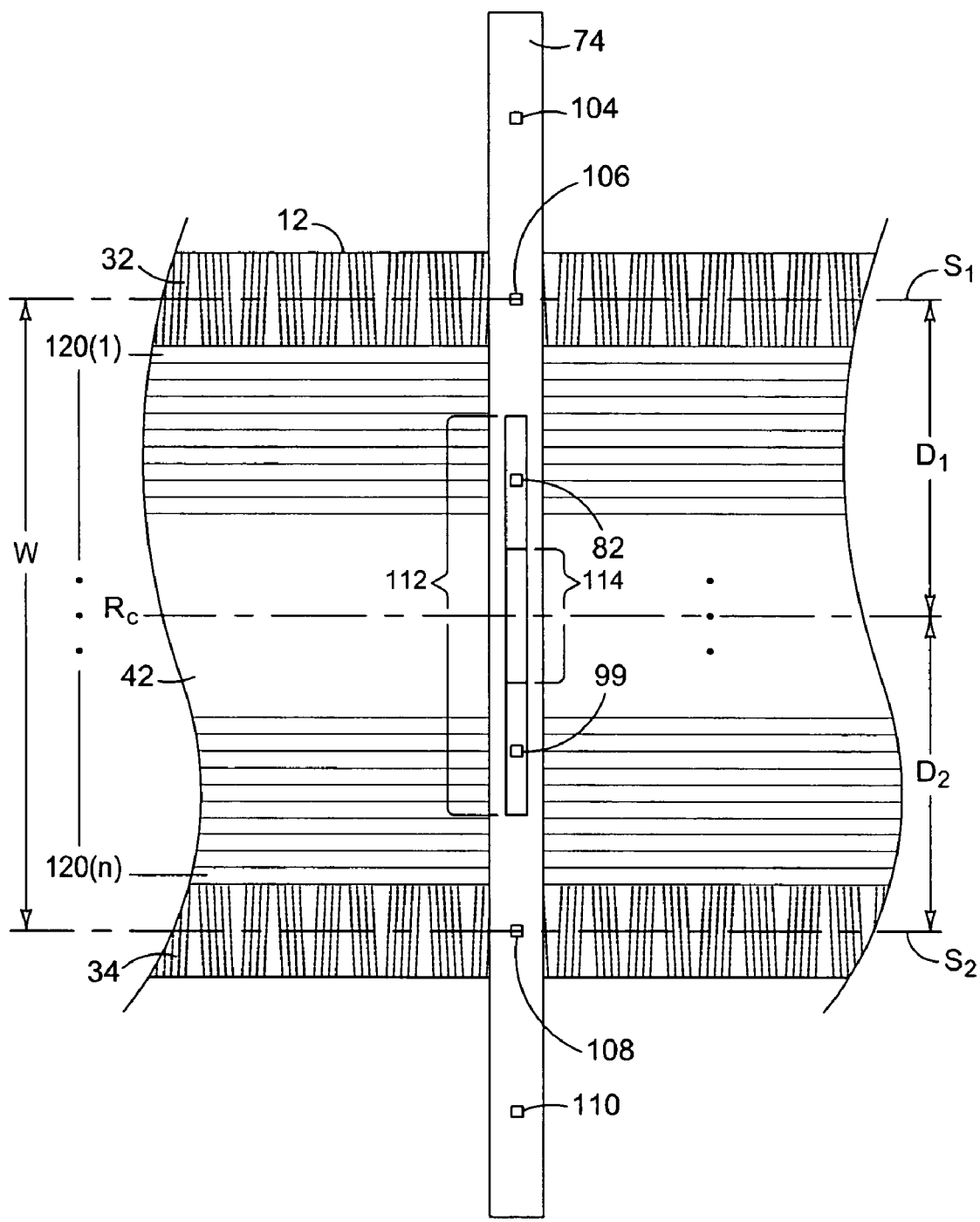
FIGS. 8 and 9 illustrate the head shown in FIG. 6 centered over the middle of a data band from the tape format of FIG. 3.
Figure 9:
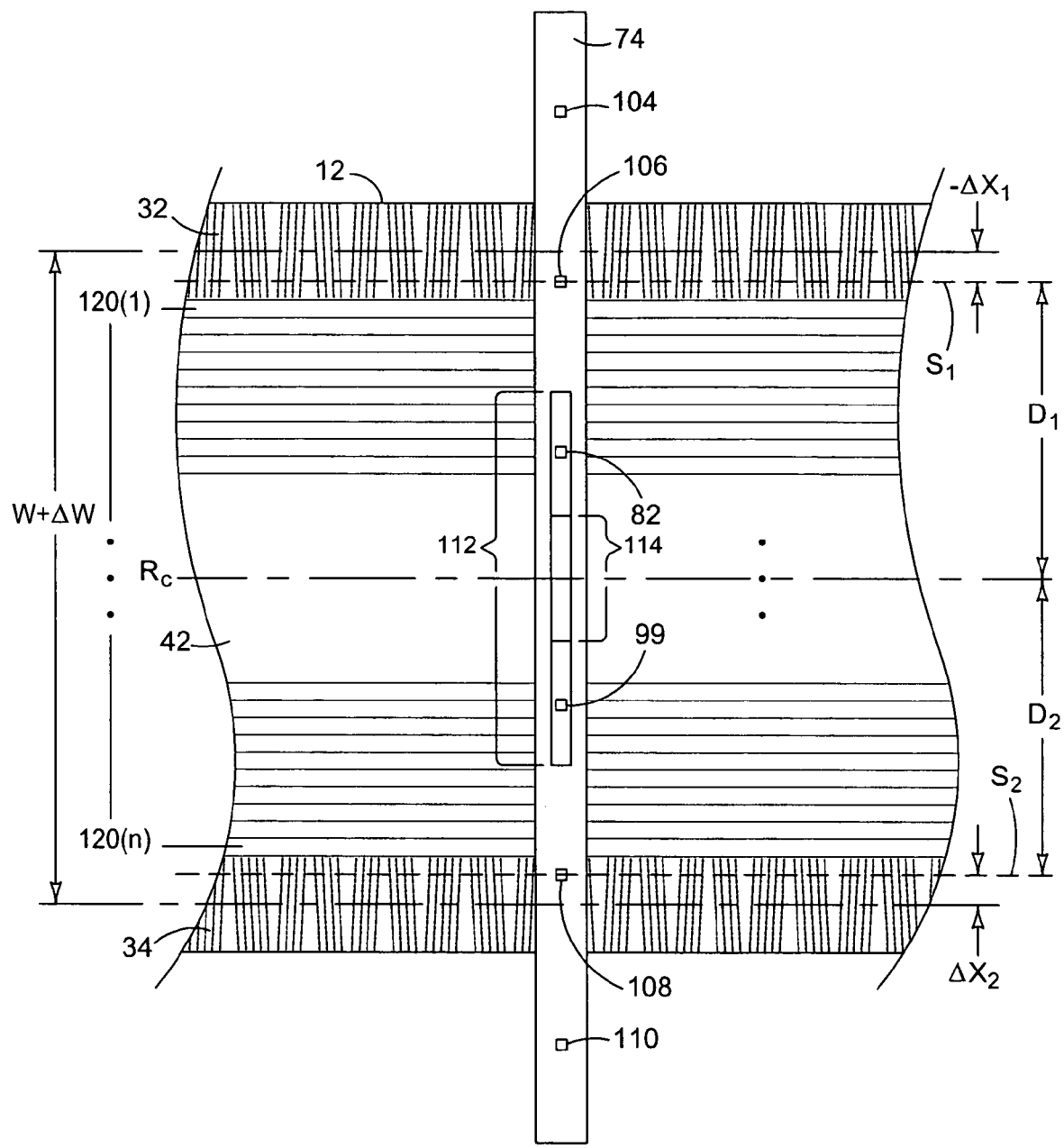

The use of head 74 to read and record data on a tape formatted like tape 12 in FIG. 3 will now be described with reference to FIGS. 8–13. FIGS. 8–13 show head 74 positioned over, for example, data band 142 bordered by servo bands 132 and 234 along a portion of tape 12. Data band 142 includes multiple tracks 120(1)–120(n). Head 74 may be used in two modes. In a first mode, when tape 12 is a third generation tape for example, then the elements in first group 112 (elements 78–83, 86, 89, 92, 95, and 98–103 in FIG. 6) are used to read and record data on tape 12 in connection with positioning information read by servo elements 106 and 108. In this first mode, the array of first group elements 112 are aligned to the center of the data band (data band 142 in this example) at reference line $R_C$ as shown in FIGS. 8 and 9. In the third generation LTO tape 12, each data band includes 176 tracks. So, in this mode each of the sixteen first group 112 elements accesses eleven tracks during fine positioning in each data band. A set of sixteen tracks recorded simultaneously is called a wrap. The eleven wraps on each data band are recorded in a spiraling sequence. Positioning information on servo band 132 and servo band 234 read by servo elements 106 and 108 is used to control the movement of head 74 between and during each wrap.

In a second mode, if tape 12 is a fourth generation tape for example, then the elements in second group 114 (elements 83–98 in FIG. 6) are used to read and record data on tape 12 in connection with positioning information read by servo elements 104, 106, 82/116, 99/118, 108 and 110. In the embodiment of head 74 shown in FIGS. 6–13, the span of the elements in second group 114 along head 74 is ⅓ the span of the elements in first group 112. In this second mode, therefore, second group elements 114 must be positioned at three different locations within data band 142 to read all tracks 120(1)–120(n). FIGS. 8 and 9 illustrates head 74 with second group 114 located during coarse positioning over the middle third of data band 142. In this location, position information is read by servo elements 106 and 108 and the array of second group elements 114 is aligned to the center of data band 142 at reference line $R_C$.

Figure 10:
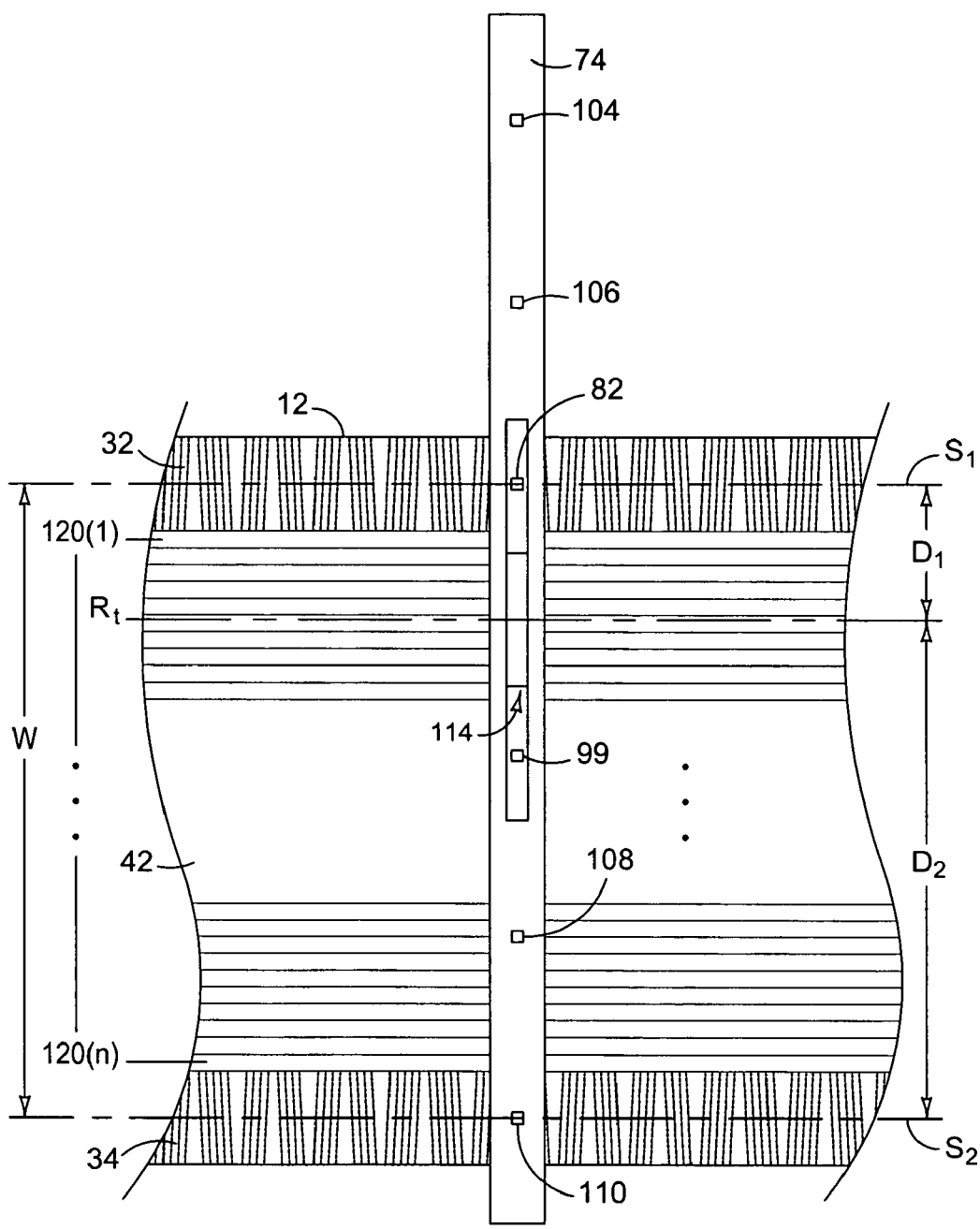
FIGS. 10 and 11 illustrate the head shown in FIG. 6 centered over the top of a data band from the tape format of FIG. 3.
Figure 11:
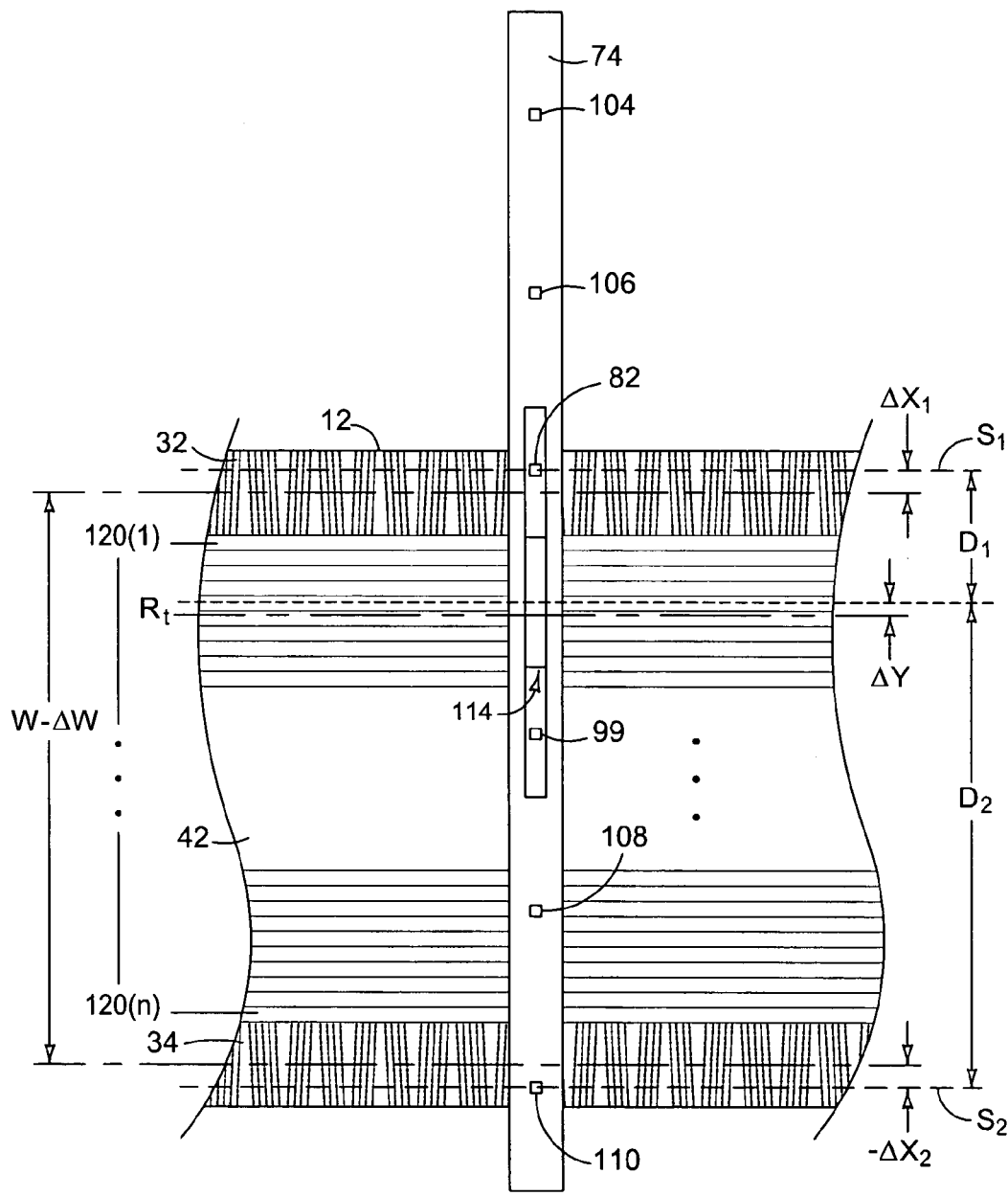
Figure 12:
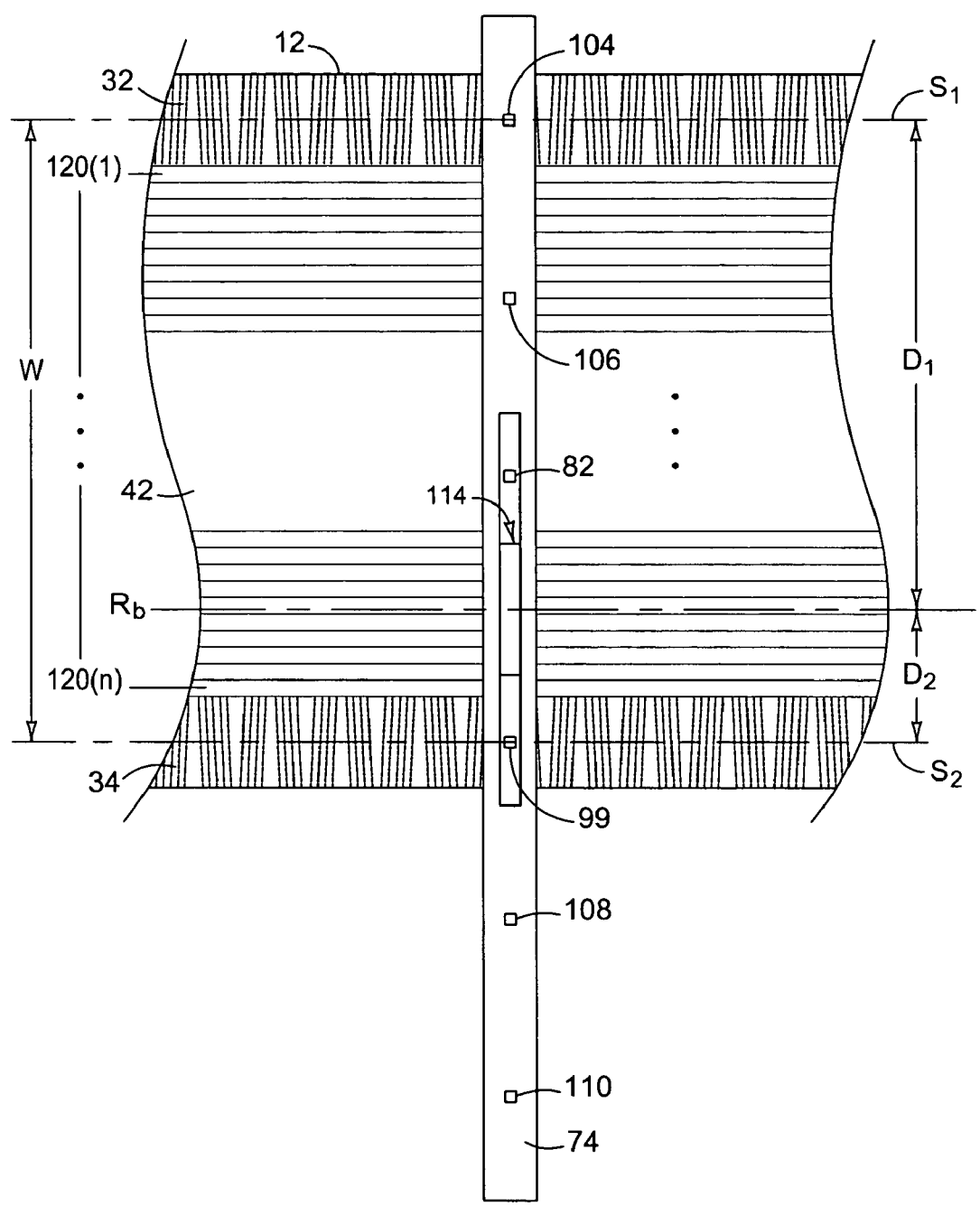
FIGS. 12 and 13 illustrate the head shown in FIG. 6 centered over the bottom of a data band from the tape format of FIG. 3.
Figure 13:
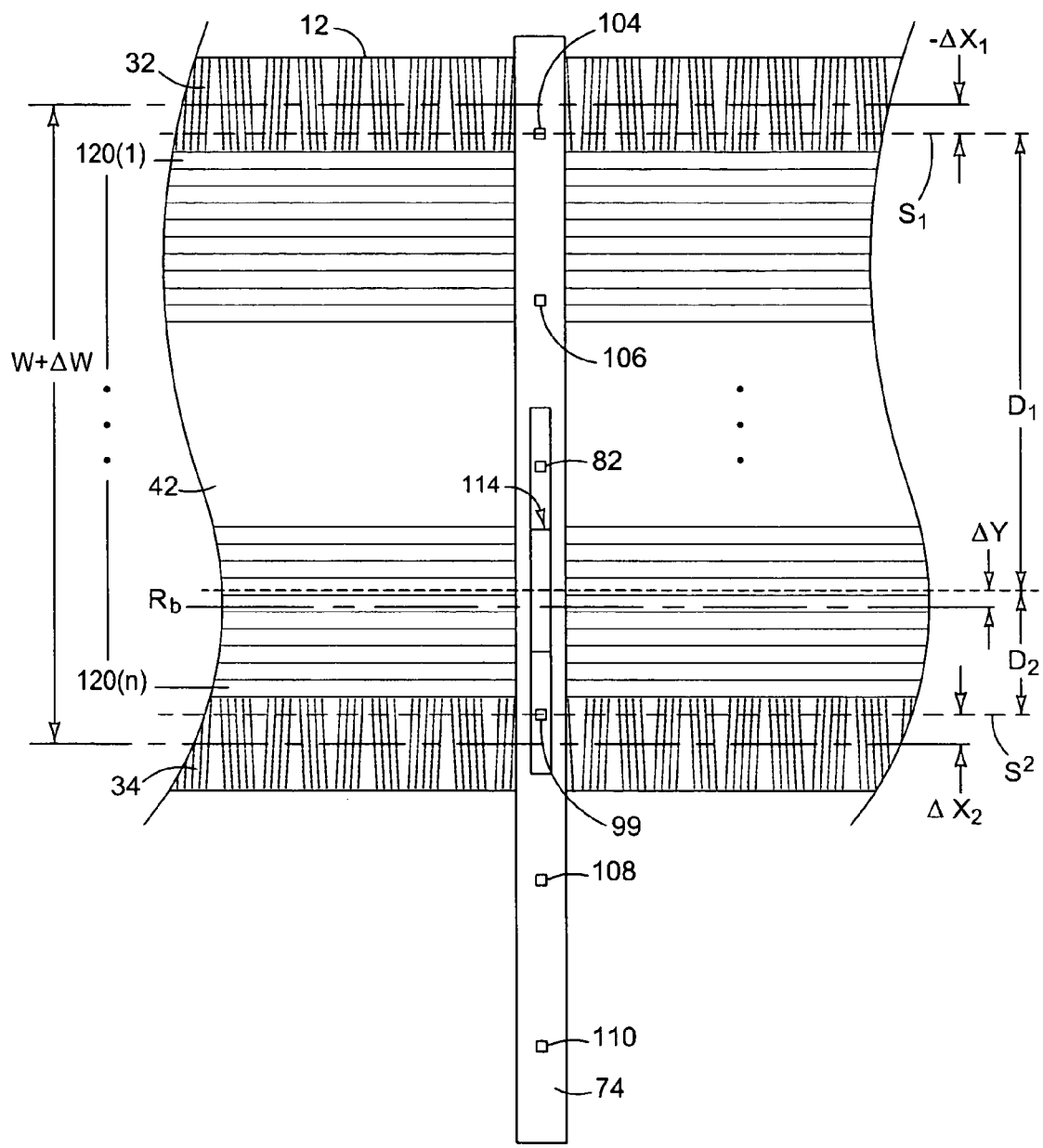

FIGS. 10 and 11 illustrate head 74 with second group 114 located during coarse positioning over the top third of data band 142. In this location, position information is read by servo elements 82/116 and 110 and the array of second group elements 114 is aligned to the center of the top third of data band 142 at reference line $R_T$. FIGS. 12 and 13 illustrate head 74 with second group 114 located during coarse positioning over the bottom third of data band 142. In this location, position information is read by servo elements 104 and 99/118 and the array of second group elements 114 is aligned to the center of the bottom third of data band 142 at reference line $R_B$. In the fourth generation LTO tape 12 each data band may include as many as 288 tracks (1152 tracks total across the four data bands). So, each of the sixteen second group 114 elements would access eighteen tracks in each data band from three different locations (coarse positioning) covering six tracks in each location (fine positioning).

In a typical dual band servo positioning system like that shown in the figures, servo signals $S_1$ and $S_2$ indicate how far the servo element is away from the center of the servo band. Each servo signal, commonly referred to as a position error signal (PES), is derived from a repeating sequence of prerecorded servo frames read by the servo elements. In FIG. 8, servo elements 106 and 108 are aligned with the center of each servo band 32 and 34 and, therefore, signals $S_1$ and $S_2$ will indicate no off-center deviation. In FIG. 9, the width W of data band 142 has expanded to W+ΔW and servo elements 106 and 108 are no longer aligned with the center of each servo band 32 and 34. Signals $S_1$ and $S_2$, therefore, will indicate an off-center deviation $-\Delta X_1$ and $\Delta X_2$. When the target reference for head 74 is the center of the data band, as indicated by reference $R_C$ in FIGS. 8 and 9, the two signals $S_1$ and $S_2$ are averaged to obtain the desired position control signal S. If, however, the target reference for head 74 is not at the center of the data band, then each of the two signals $S_1$ and $S_2$ should be weighted according to the position of the target reference to obtain a more accurate servo control signal S.

For example, in FIGS. 10 and 11, the target reference $R_T$ for head 74 is the center of the top third of the data band 142. In FIG. 10, servo elements 82/116 and 110 are aligned with the center of each servo band 32 and 34 and, therefore, signals $S_1$ and $S_2$ will indicate no off-center deviation. In FIG. 11, the width W of data band 142 has contracted to W−ΔW and servo elements 82/116 and 110 are no longer aligned with the center of each servo band 32 and 34. Signals $S_1$ and $S_2$, therefore, will indicate an off-center deviation $\Delta X_1$ and $-\Delta X_2$. If the contraction is uniform out from the center of the tape, then the actual deviation ΔY of head 74 from target reference $R_T$ is proportionately closer to $S_1$ than $S_2$.

The same analysis applies to the position of head 74 in FIGS. 12 and 13. In FIG. 12, servo elements 104 and 99/118 are aligned with the center of each servo band 32 and 34 and, therefore, signals $S_1$ and $S_2$ will indicate no off-center deviation. In FIG. 13, the width W of data band 142 has expanded to W+ΔW and servo elements 104 and 99/118 are no longer aligned with the center of each servo band 32 and 34. Signals $S_1$ and $S_2$, therefore, will indicate an off-center deviation $-\Delta X_1$ and $\Delta X_2$. If the expansion is uniform out from the center of the tape, then the actual deviation ΔY of head 74 from target reference $R_B$ is proportionately closer to $S_2$ than $S_1$.

One formula for computing the weighting factor assigned to each servo signal $S_1$ and $S_2$ to determine the desired servo control signal S is described in Equation 1.

$$S = \frac{D_2}{D_1 + D_2} S_1 + \frac{D_1}{D_1 + D_2} S_2 \qquad \text{Equation 1}$$

where $D_1$ is the distance between the center of the array of data elements and the servo element reading the top servo band and $D_2$ is the distance between the center of the array of data elements and the servo element reading the bottom servo band. The weighting factors $$\frac{D_2}{D_1 + D_2}$$

for servo signal $S_1$ and $$\frac{D_1}{D_1 + D_2}$$

for servo signal $S_2$ represent the relative spacing between the center of the data element array and the servo elements that are positioned over the servo bands, as best seen by comparing the position of head 74 and the corresponding distances $D_1$ and $D_2$ in FIGS. 8–9, 10–11 and 12–13.

The spacing between the center of the array and the servo elements reflects the position of the target head reference on the data band. For example, and referring again to FIGS. 8–13, servo elements 104, 106, 82, 99, 108 and 110 are spaced apart from the center of array 114 so that when element array 114 is centered over a target reference $R_C$ (FIGS. 8–9), $R_T$ (FIGS. 10–11) or $R_B$ (FIGS. 12–13), one pair of servo elements 106, 108 (FIGS. 8–9), 82, 110 (FIGS. 10–11) and 104, 99 (FIGS. 12–13) is positioned over servo bands 32 and 34. Ideally, each servo element 106, 82, 104 and 108, 110 and 99 will be centered on each servo band 32, 34 when the center of the array is positioned over the corresponding target reference $R_C$, $R_T$ and $R_B$, as shown in FIGS. 8, 10 and 12. In FIGS. 8 and 9, the target reference for head 74 $R_C$ is located at the center of data band 42 and, therefore, $D_1$ and $D_2$ are equal. In FIGS. 10 and 11, by contrast, the target reference for head 74 $R_T$ is located in the top third of data band 42 and, therefore, $D_2$ is approximately three times $D_1$.

Weighting the servo signals based on the distances between the element array and the reading servo elements is desirable because these distances are constant for a given head target reference. Other distances, however, could be used.

Figure 14:
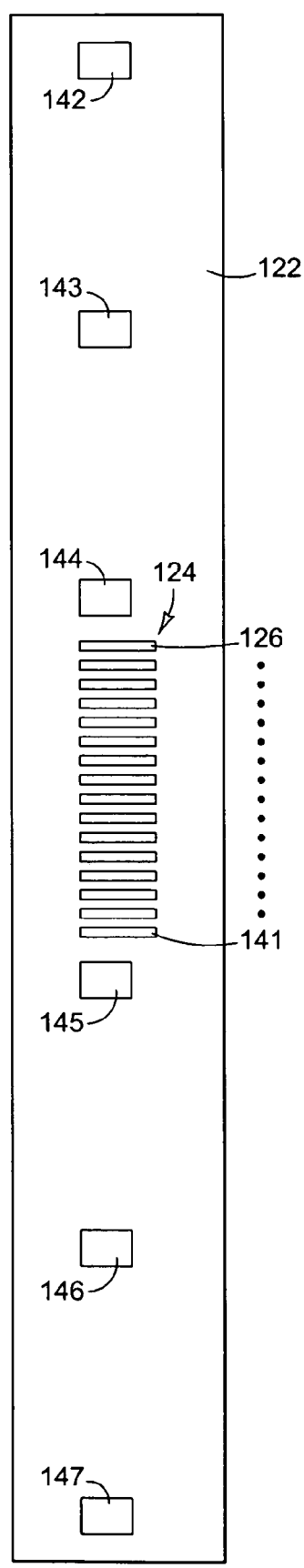
FIG. 14 is a schematic illustration of an array of head elements.

FIG. 14 is a schematic illustration of a head 122 that includes an array 124 of sixteen data elements 126–141 and six servo elements 142–147. FIGS. 15–20 show head 122 positioned over, for example, data band 142 bordered by servo bands 132 and 234 along a portion of tape 12. Data band 142 includes multiple tracks 120(1)–120(n). Data element array 124 spans approximately ⅓ of data band 142. Array 124, therefore, must be positioned at three different locations within data band 142 to read all tracks 120(1)–120(*n*). Data band 142 typically will include many more than 48 tracks. Consequently, array 124 will be moved through multiple positions at each location to cover all tracks. For example, if there are 288 tracks across data band 142 (1152 tracks total across the four data bands), then each of the sixteen data elements in array 124 would access six tracks at each of the three locations.

Figure 15:
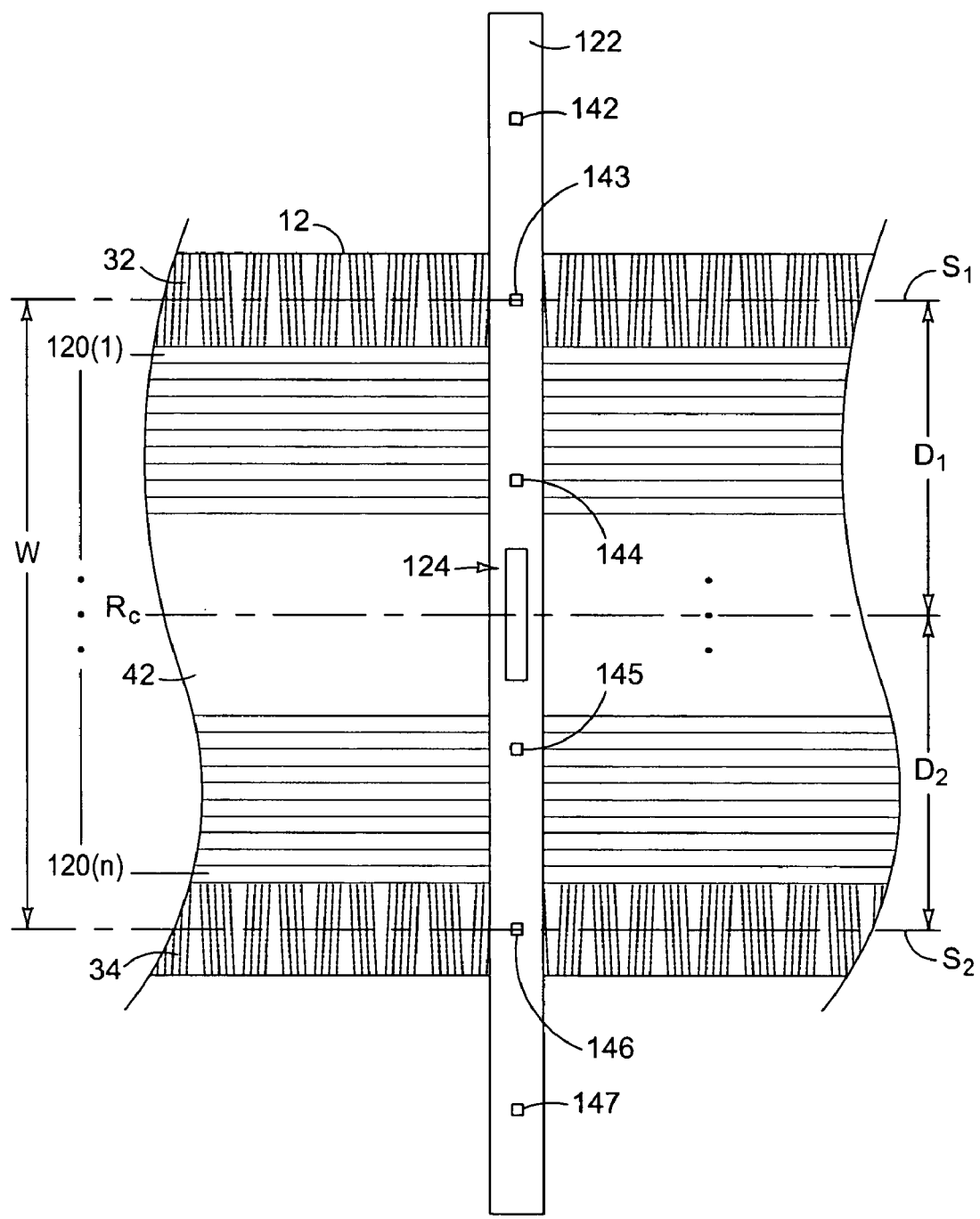
FIGS. 15 and 16 illustrate the head shown in FIG. 11 centered over the middle a data band from the tape format of FIG. 3.
Figure 16:
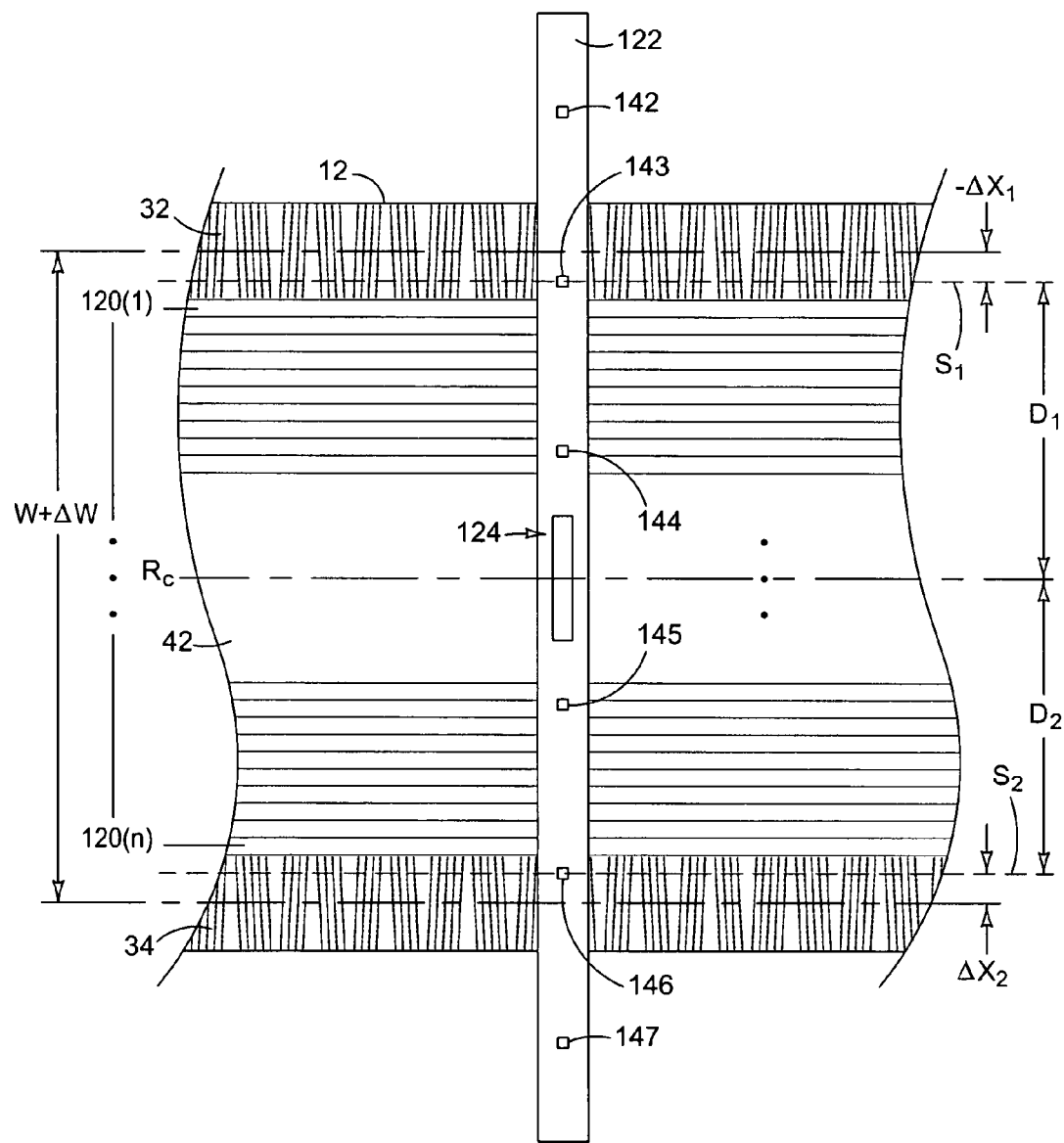
Figure 17:
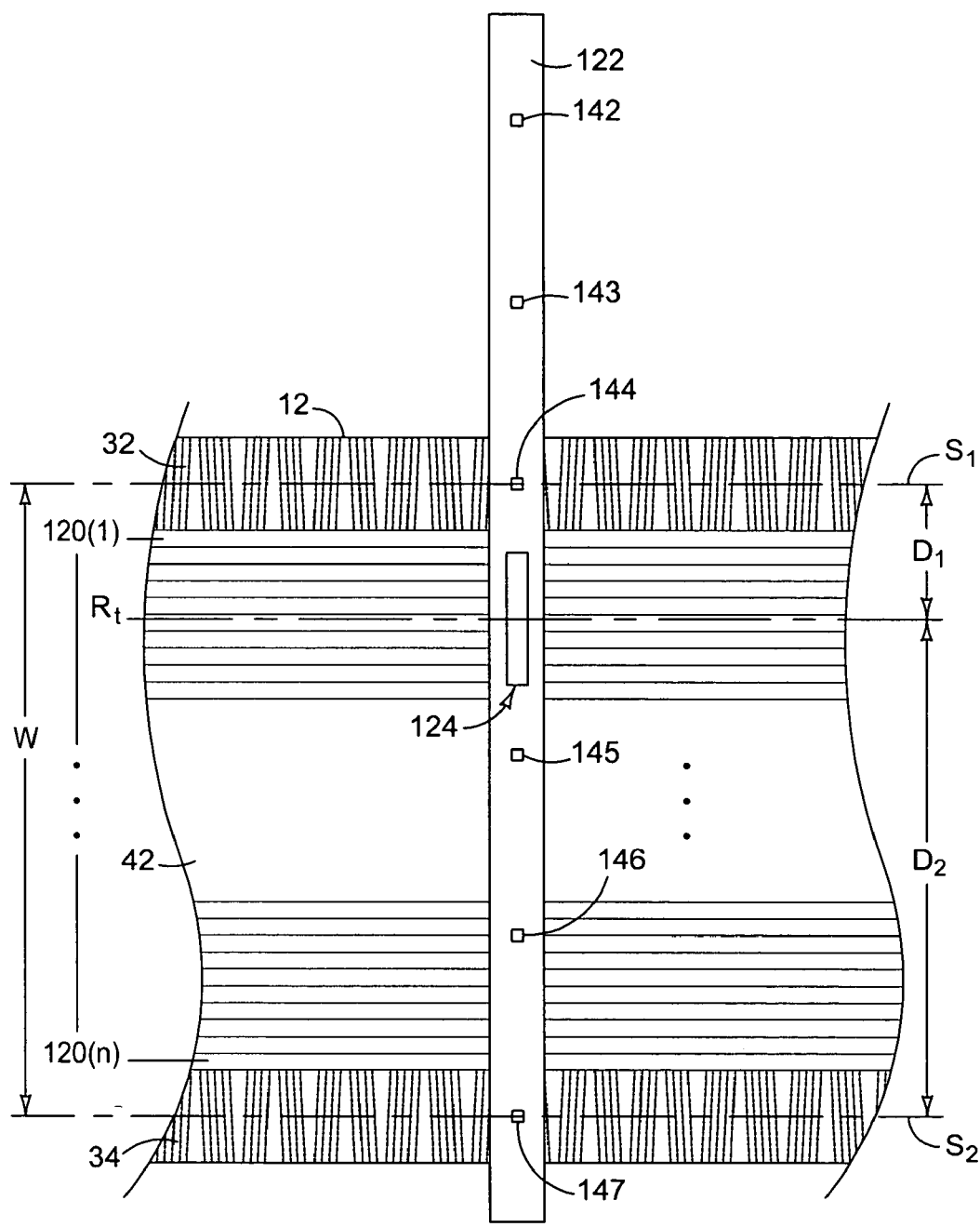
FIGS. 17 and 18 illustrate the head shown in FIG. 14 centered over the top of a data band from the tape format of FIG. 3.
Figure 18:
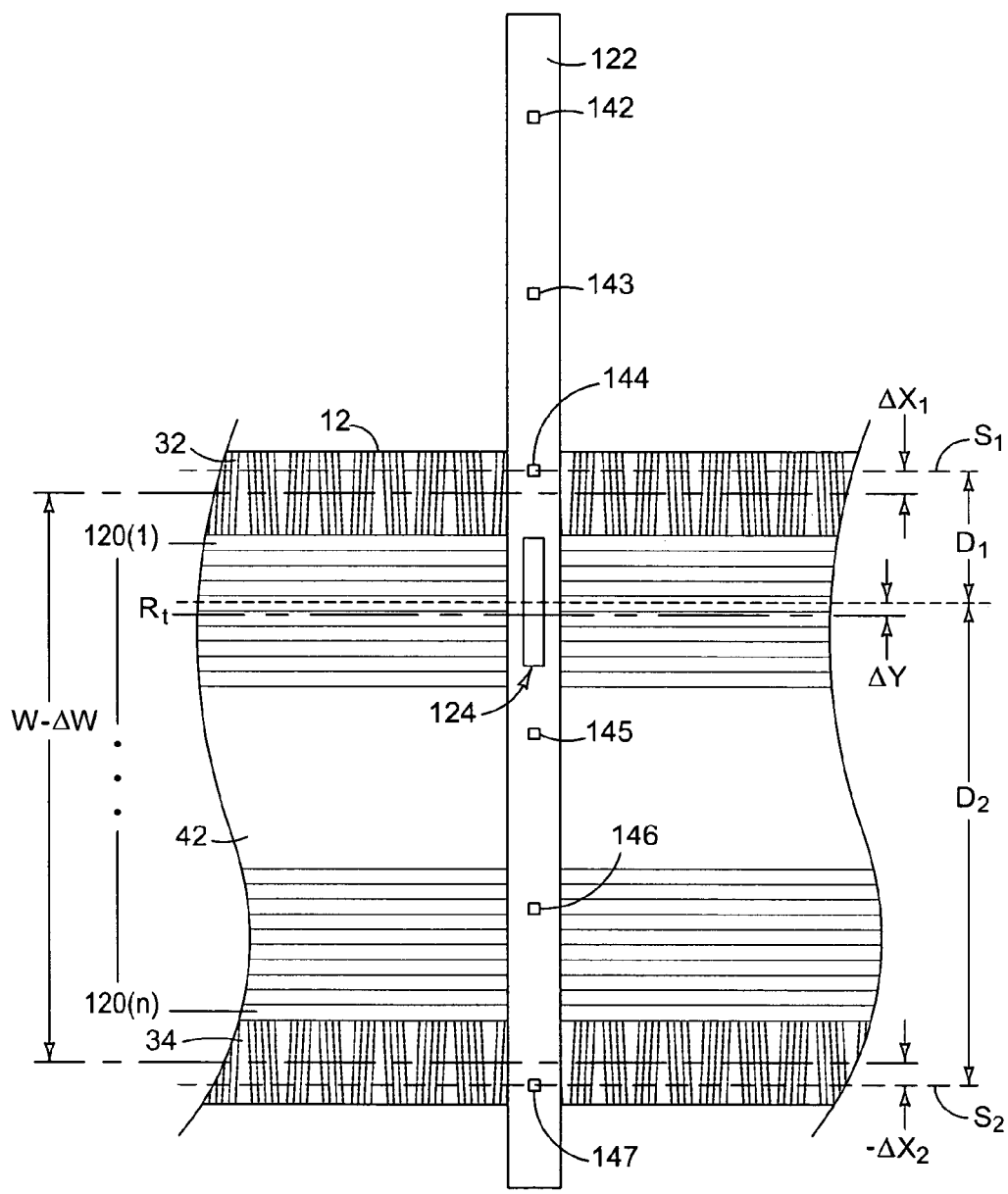
Figure 19:
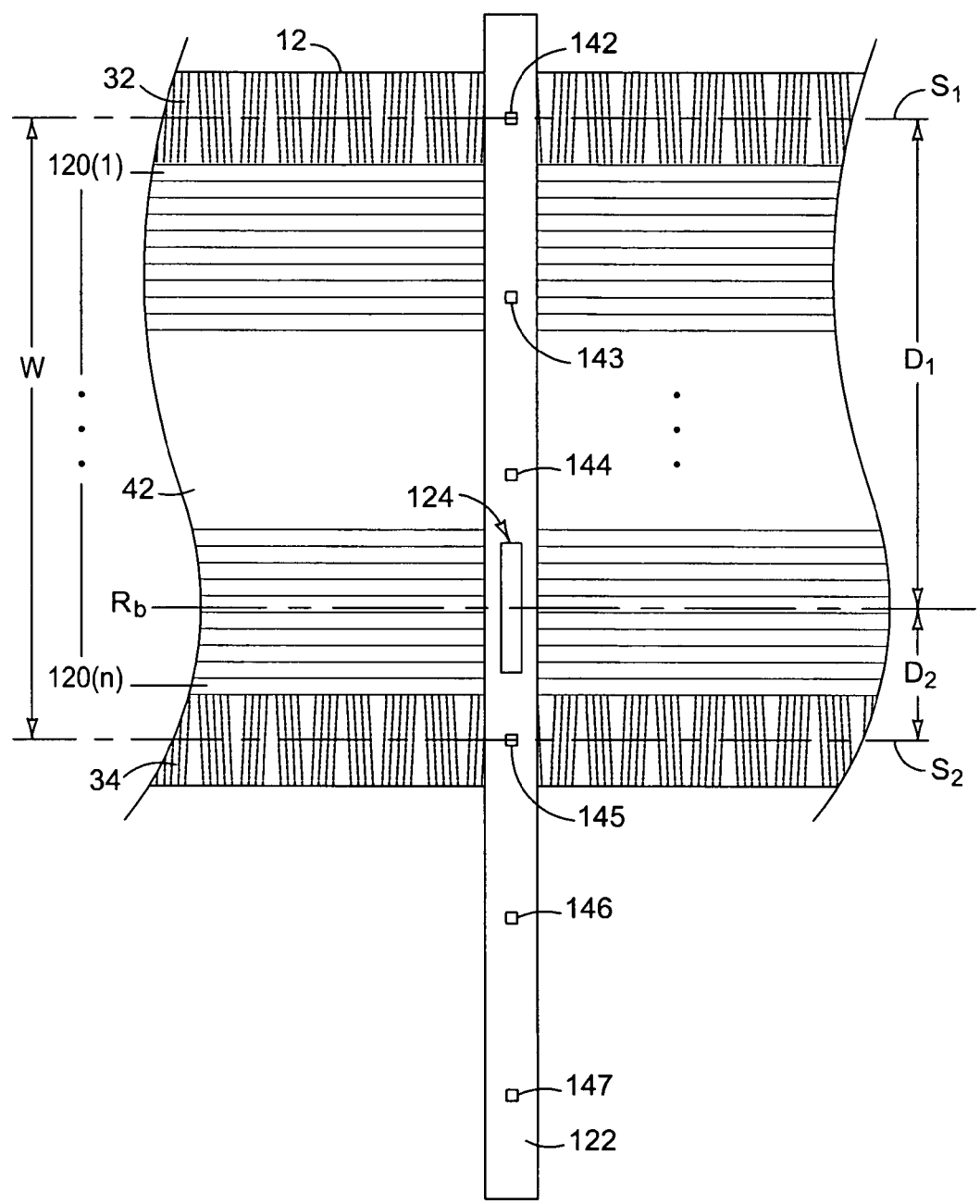
FIGS. 19 and 20 illustrate the head shown in FIG. 14 centered over the top of a data band from the tape format of FIG. 3.
Figure 20:
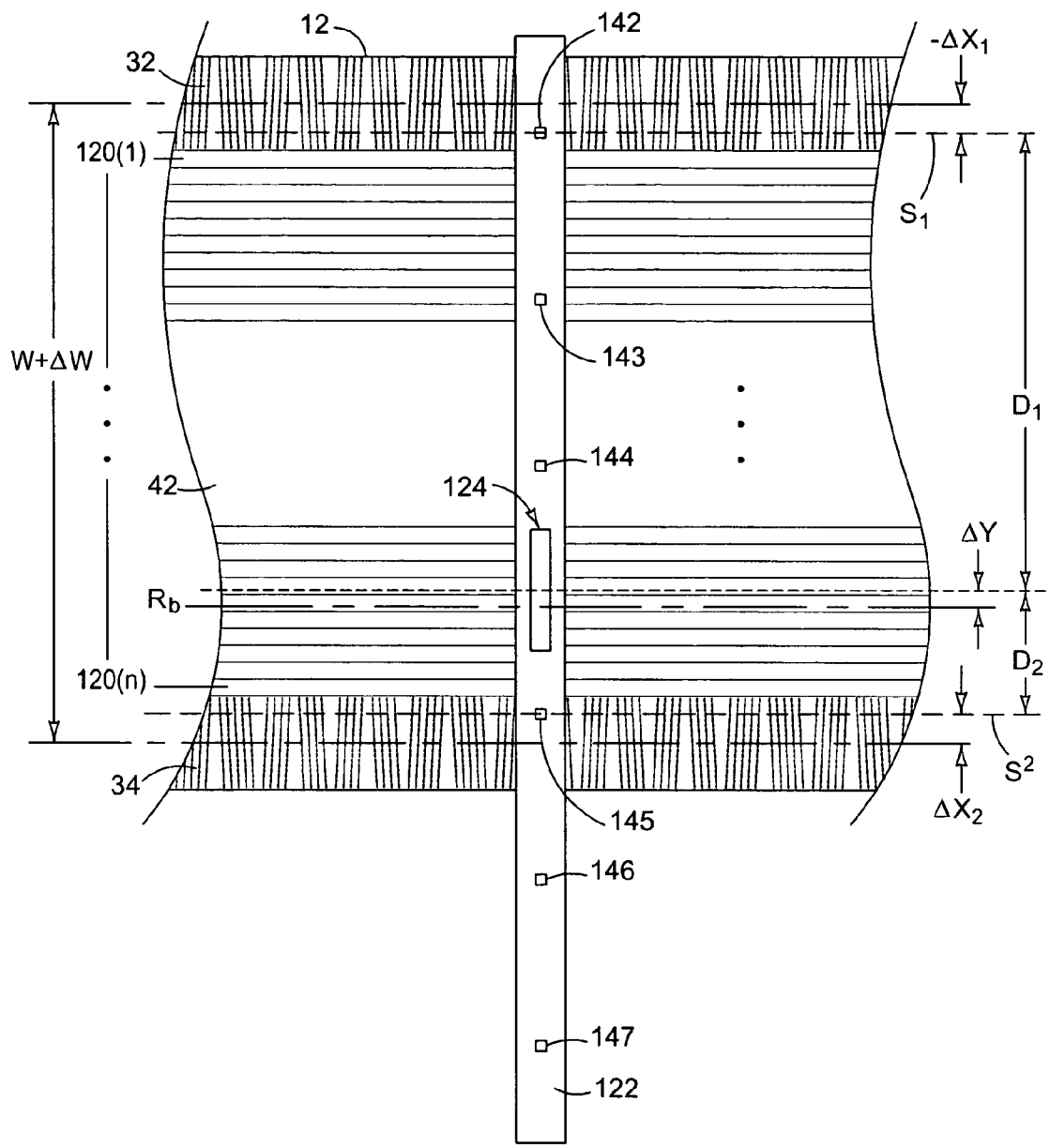

In FIGS. 15 and 16, array 124 is located over the middle third of data band 142. At this location, position information is read from servo bands 132 and 234 by servo elements 143 and 146 and array 124 is aligned to the center of data band 142 at reference line $R_C$. In FIGS. 17 and 18, array 124 is located over the top third of data band 142. At this location, position information is read from servo bands 132 and 234 by servo elements 144 and 147 and array 124 is aligned to the center of the top third of data band 142 at reference line $R_T$. In FIGS. 19 and 20, array 124 is located over the bottom third of data band 142. At this location, position information is read from servo bands 132 and 234 by servo elements 142 and 145 and array 124 is aligned to the center of the bottom third of data band 142 at reference line $R_B$.

In FIG. 15, servo elements 143 and 146 are aligned with the center of each servo band 32 and 34 and, therefore, signals $S_1$ and $S_2$ will indicate no off-center deviation. In FIG. 16, the width W of data band 142 has expanded to W+ΔW and servo elements 143 and 146 are no longer aligned with the center of each servo band 32 and 34. Signals $S_1$ and $S_2$, therefore, will indicate an off-center deviation −Δ$X_1$ and Δ$X_2$. Each of the two signals $S_1$ and $S_2$ is weighted according to Equation 1 to obtain the desired servo control signal S.

In FIG. 17, servo elements 144 and 147 are aligned with the center of the top third of each servo band 32 and 34 and, therefore, signals $S_1$ and $S_2$ will indicate no off-center deviation. In FIG. 18, the width W of data band 142 has contracted to W−ΔW and servo elements 144 and 147 are no longer aligned with the center of each servo band 32 and 34. Signals $S_1$ and $S_2$, therefore, will indicate an off-center deviation Δ$X_1$ and −Δ$X_2$. Each of the two signals $S_1$ and $S_2$ is weighted according to Equation 1 to obtain the desired servo control signal S to correct for the actual head deviation ΔY.

In FIG. 19, servo elements 142 and 145 are aligned with the center of the bottom third of each servo band 32 and 34 and, therefore, signals $S_1$ and $S_2$ will indicate no off-center deviation. In FIG. 20, the width W of data band 142 has expanded to W+ΔW and servo elements 142 and 145 are no longer aligned with the center of each servo band 32 and 34. Signals $S_1$ and $S_2$, therefore, will indicate an off-center deviation −Δ$X_1$ and Δ$X_2$. Each of the two signals $S_1$ and $S_2$ is weighted according to Equation 1 to obtain the desired servo control signal S to correct for the actual head deviation ΔY.

It is expected that the weighting algorithm reflected in Equation 1 will typically be implemented through firmware or other programming for controller 28 in tape drive 10 in the same manner simple averaging is currently implemented in second and third generation LTO drives. This programming may be embodied in firmware or any other suitable computer readable medium for use by or in connection with an instruction execution system such as a computer/processor based system or an ASIC (Application Specific Integrated Circuit) or other system that can fetch or obtain the programming from a computer readable medium and execute the instructions contained therein. "Computer readable medium" can be any medium that can contain, store, transmit, propagate or maintain programs and data for use by or in connection with the instruction execution system.

The exemplary embodiments shown in the figures and described above illustrate but do not limit the invention. Other forms, details, and embodiments may be made and implemented. Hence, the foregoing description should not be construed to limit the scope of the invention, which is definded in the following claims.

What is claimed is:

1. A servo positioning method, comprising:
   deriving a first servo signal $S_1$ from a first servo band;
   deriving a second servo signal $S_2$ from a second servo band;
   defining a head element reference between the servo bands;
   weighting each servo signal according to a ratio of distances between the head element reference and a location on each servo band; and
   computing a servo control signal based on the weighted servo signals.

2. The method of claim 1, wherein weighting and computing comprise computing a servo control signal S according to the equation $$S = \frac{D_2}{D_1 + D_2} S_1 + \frac{D_1}{D_1 + D_2} S_2$$

where $D_1$ is the distance between a reference on the first servo band and an element array reference on a data band bordered by the first and second servo bands and $D_2$ is the distance between a reference on the second servo band and the element array reference on the data band.

3. The method of claim 1, wherein weighting and computing comprise computing a servo control signal S according to the equation $$S = \frac{D_2}{D_1 + D_2} S_1 + \frac{D_1}{D_1 + D_2} S_2$$

where $D_1$ is the distance between a center of an array of data elements and a first servo element reading the first servo band and $D_2$ is the distance between the center of the array of data elements and a second servo element reading the second servo band.

4. A servo positioning method, comprising:
   deriving a first servo signal $S_1$ from a first servo band;
   deriving a second servo signal $S_2$ from a second servo band; and
   computing a servo control signal S according to the equation $$S = \frac{D_2}{D_1 + D_2} S_1 + \frac{D_1}{D_1 + D_2} S_2$$

where $D_1$ is the distance between a center of an array of data elements and a first servo element reading the first servo band and $D_2$ is the distance between the center of the array of data elements and a second servo element reading the second servo band.

5. The method of claim 4, further comprising reading first servo information from the first servo band and reading second servo information from the second servo band, and wherein deriving the first servo signal $S_1$ comprises deriving the first servo signal $S_1$ from the first servo information and deriving the second servo signal $S_2$ comprises deriving the second servo signal $S_2$ from the second servo information.

6. A computer readable medium having programming thereon for:
   deriving a first servo signal $S_1$ from a first servo band;
   deriving a second servo signal $S_2$ from a second servo band;
   defining a head element reference between the servo bands;
   weighting each servo signal according to a ratio of distances between the head element reference and a location on each servo band; and
   computing a servo control signal based on the weighted servo signals.

7. The medium of claim 6, wherein weighting and computing comprise computing a servo control signal S according to the equation $$S = \frac{D_2}{D_1 + D_2} S_1 + \frac{D_1}{D_1 + D_2} S_2$$

where $D_1$ is the distance between a reference on the first servo band and an element array reference on a data band bordered by the first and second servo bands and $D_2$ is the distance between a reference on the second servo band and the element array reference on the data band.

8. The medium of claim 6, wherein weighting and computing comprise computing a servo control signal S according to the equation $$S = \frac{D_2}{D_1 + D_2} S_1 + \frac{D_1}{D_1 + D_2} S_2$$

where $D_1$ is the distance between a center of an array of data elements and a first servo element reading the first servo band and $D_2$ is the distance between the center of the array of data elements and a second servo element reading the second servo band.

9. A computer readable medium having programming thereon for:
   deriving a first servo signal $S_1$ from a first servo band;
   deriving a second servo signal $S_2$ from a second servo band; and
   computing a servo control signal S according to the equation $$S = \frac{D_2}{D_1 + D_2} S_1 + \frac{D_1}{D_1 + D_2} S_2$$

where $D_1$ is the distance between a center of an array of data elements and a first servo element reading the first servo band and $D_2$ is the distance between the center of the array of data elements and a second servo element reading the second servo band.

10. The medium of claim 9, further having programming thereon for reading first servo information from the first servo band and reading second servo information from the second servo band, and wherein deriving the first servo signal $S_1$ comprises deriving the first servo signal $S_1$ from the first servo information and deriving the second servo signal $S_2$ comprises deriving the second servo signal $S_2$ from the second servo information.

11. A servo positioning system, comprising:
   means for deriving a first servo signal $S_1$ from a first servo band;
   means for deriving a second servo signal $S_2$ from a second servo band; and
   means for computing a servo control signal S according to the equation $$S = \frac{D_2}{D_1 + D_2} S_1 + \frac{D_1}{D_1 + D_2} S_2$$

where $D_1$ is the distance between a center of an array
   of data elements and a first servo element reading the first servo band and $D_2$ is the distance between the center of the array of data elements and a second servo element reading the second servo band.

12. A tape recording system, comprising:
   a tape formatted with servo bands having head positioning information recorded thereon and data bands for recording data on parallel tracks within each data band, a pair of servo bands bordering each data band;
   a head for recording data on parallel tracks on the data bands, the head including
      a number of pairs of servo elements, each element in each pair spaced apart from one another in a transverse direction generally perpendicular to the direction the tape travels past the head during read and record operations and each succeeding pair disposed between the elements of a preceding pair; and
      an array of data elements positioned between the elements in a last pair of servo elements, the array of data elements nominally spanning a fraction of the width of a data band corresponding to the number of pairs of servo elements,
      the servo elements disposed on the head such that when the array of data elements is positioned over a first fraction of the width of the data band a first pair of servo elements is positioned over the servo bands, and when the array of data elements is positioned over a second fraction of the width of the data band a second pair of servo elements Is positioned over the servo bands, and so on for each remaining pair of servo elements, if any, and each corresponding fraction of the data band; and an electronic controller configured to execute programming for
      deriving a first servo signal $S_1$ from a first servo band in a pair of servo bands;
      deriving a second servo signal $S_2$ from a second servo band in the pair of servo bands; and
      computing a servo control signal S according to the equation $$S = \frac{D_2}{D_1 + D_2} S_1 + \frac{D_1}{D_1 + D_2} S_2$$

where $D_1$ is the distance between a reference on the first servo band and an element array reference on a data band bordered by the first and second servo bands and $D_2$ is the distance between a reference on the second servo band and the element array reference on the data band.

13. The system of claim 12, wherein $D_1$ is equal to the distance between a center of the array of data elements and a first servo element reading the first servo band and $D_2$ is equal to the distance between the center of the array of data elements and a second servo element reading the second servo band.

14. The system of claim 12, wherein the number of pairs of servo elements is 2 and the fraction of the width of a data band is ½.

15. The system of claim 12, wherein the number of pairs of servo elements is 3 and the fraction of the width of a data band is ⅓.

16. A tape drive, comprising:
a take-up reel;
a head comprising a first group of data elements spanning a first distance on the head and a second group of data elements spanning a second distance on the head greater than the first distance, the second group overlapping the first group such that some elements are common to both groups;
an actuator operative to move the head in a direction generally perpendicular to the direction a tape travels past the head during read and record operations;
a tape path extending past the head to the take-up reel; and
an electronic controller configured to
receive read and write instructions and data from a computer or other host device and to control operation of the take-up reel, the actuator and the head, and
execute programming for deriving a first servo signal $S_1$ from a first servo band, deriving a second servo signal $S_2$ from a second servo band, and
computing a servo control signal S according to the equation $$S = \frac{D_2}{D_1 + D_2} S_1 + \frac{D_1}{D_1 + D_2} S_2$$

where $D_1$ is the distance between a first servo band reference and a reference between the servo bands for the first group of data elements and $D_2$ is the distance between a second servo band reference and the reference for the first group of data elements.

* * * * *

UNITED STATES PATENT AND TRADEMARK OFFICE
CERTIFICATE OF CORRECTION

PATENT NO. : 6,992,857 B2  Page 1 of 2
APPLICATION NO. : 10/770746
DATED : January 31, 2006
INVENTOR(S) : Vernon L. Knowles et al.

It is certified that error appears in the above-identified patent and that said Letters Patent is hereby corrected as shown below:

In column 3, line 20, delete "142" and insert -- 1 42 --, therefor.

In column 3, line 22, delete "132 and servo band 234" and insert -- 1 32 and servo band 2 34 --, therefor.

In column 3, line 26, delete "142" and insert -- 1 42 --, therefor.

In column 3, line 27, delete "132 and 234" and insert -- 1 32 and 2 34 --, therefor.

In column 3, line 29, delete "132 and 234" and insert -- 1 32 and 2 34 --, therefor.

In column 3, line 31, delete "142" and insert -- 1 42 --, therefor.

In column 4, line 24, delete "780-103B" and insert -- 78B-103B --, therefor.

In column 4, line 36, delete "142" and insert -- 1 42 --, therefor.

In column 4, line 37, delete "132 and 234" and insert -- 1 32 and 2 34 --, therefor.

In column 4, line 37, delete "142" and insert -- 1 42 --, therefor.

In column 4, line 45, delete "142" and insert -- 1 42 --, therefor.

In column 4, line 53, delete "132" and insert -- 1 32 --, therefor.

In column 4, line 54, delete "234" and insert -- 2 34 --, therefor.

In column 4, line 65, delete "142" and insert -- 1 42 --, therefor.

In column 5, line 1, delete "142" and insert -- 1 42 --, therefor.

In column 5, line 4, delete "142" and insert -- 1 42 --, therefor.

In column 5, line 7, delete "142" and insert -- 1 42 --, therefor.

In column 5, line 10, delete "142" and insert -- 1 42 --, therefor.

In column 5, line 12, delete "142" and insert -- 1 42 --, therefor.

In column 5, line 16, delete "142" and insert -- 1 42 --, therefor.

In column 5, line 34, delete "142" and insert -- 1 42 --, therefor.

Signed and Sealed this

Sixteenth Day of November, 2010

David J. Kappos
*Director of the United States Patent and Trademark Office*

In column 5, line 47, delete "142" and insert -- 1 42 --, therefor.

In column 5, line 51, delete "142" and insert -- 1 42 --, therefor.

In column 5, line 63, delete "142" and insert -- 1 42 --, therefor.

In column 6, line 63, delete "142" and insert -- 1 42 --, therefor.

In column 6, line 64, delete "132 and 234" and insert -- 1 32 and 2 34 --, therefor.

In column 6, line 65, delete "142" and insert -- 1 42 --, therefor.

In column 6, line 66, delete "142" and insert -- 1 42 --, therefor.

In column 7, line 1, delete "142" and insert -- 1 42 --, therefor.

In column 7, line 2, delete "142" and insert -- 1 42 --, therefor.

In column 7, line 5, delete "142" and insert -- 1 42 --, therefor.

In column 7, line 10, delete "142" and insert -- 1 42 --, therefor.

In column 7, line 11, delete "132 and 234" and insert -- 1 32 and 2 34 --, therefor.

In column 7, line 13, delete "142" and insert -- 1 42 --, therefor.

In column 7, line 14, delete "142" and insert -- 1 42 --, therefor.

In column 7, line 15, delete "132 and 234" and insert -- 1 32 and 2 34 --, therefor.

In column 7, line 17, delete "142" and insert -- 1 42 --, therefor.

In column 7, line 19, delete "142" and insert -- 1 42 --, therefor.

In column 7, line 20, delete "132 and 234" and insert -- 1 32 and 2 34 --, therefor.

In column 7, line 22, delete "142" and insert -- 1 42 --, therefor.

In column 7, line 26, delete "142" and insert -- 1 42 --, therefor.

In column 7, line 36, delete "142" and insert -- 1 42 --, therefor.

In column 7, line 47, delete "142" and insert -- 1 42 --, therefor.

In column 10, line 44, in Claim 12, delete "Is" and insert -- is --, therefor.

In column 11, line 22, in Claim 16, delete "reef" and insert -- reel --, therefor.